United States Patent
Kuang et al.

(10) Patent No.: US 8,885,362 B2
(45) Date of Patent: Nov. 11, 2014

(54) FAST STARTUP SWITCHING CONVERTER AND METHOD THEREOF

(75) Inventors: Naixing Kuang, Hangzhou (CN); Jiali Cai, Hangzhou (CN); Hongxia Yu, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 19 days.

(21) Appl. No.: 13/612,401

(22) Filed: Sep. 12, 2012

(65) Prior Publication Data

US 2013/0077353 A1 Mar. 28, 2013

(30) Foreign Application Priority Data

Sep. 23, 2011 (CN) .......................... 2011 1 0285566

(51) Int. Cl.
*H02M 3/335* (2006.01)
(52) U.S. Cl.
USPC ...................................... 363/21.12
(58) Field of Classification Search
USPC .......................................... 363/21.12–21.18
See application file for complete search history.

(56) References Cited

U.S. PATENT DOCUMENTS

| | | | |
|---|---|---|---|
| 6,775,164 B2* | 8/2004 | Wong et al. | 363/147 |
| 7,307,390 B2* | 12/2007 | Huynh et al. | 315/291 |
| 2006/0285365 A1* | 12/2006 | Huynh et al. | 363/16 |
| 2008/0192515 A1* | 8/2008 | Huynh et al. | 363/21.12 |
| 2010/0214807 A1 | 8/2010 | Li | |

\* cited by examiner

*Primary Examiner* — Jue Zhang
(74) *Attorney, Agent, or Firm* — Perkins Coie LLP

(57) ABSTRACT

A fast startup switching converter having a first switch, a second switch, a third switch, a first capacitor, and a controller controlling the ON and OFF switching of the second and third switches. The first terminal of the first switch is coupled to the input terminal of the switching converter, the second terminal is coupled to the first terminal of the second switch. The first terminal of the third switch is coupled to the second terminal of the first switch and the first terminal of the second switch. The first capacitor is coupled to the second terminal of the third switch and the controller to provide a power supply voltage for the controller. The switching converter charges the first capacitor through the first and third switches in a first working state, and transfers energy to a load through the first and second switches in a second working state.

14 Claims, 5 Drawing Sheets

US 8,885,362 B2

FAST STARTUP SWITCHING CONVERTER AND METHOD THEREOF

CROSS-REFERENCE TO RELATED APPLICATION(S)

This application claims the benefit of CN application 201110285566.X, filed on Sep. 23, 2011, and incorporated herein by reference.

TECHNICAL FIELD

Embodiments of the present invention generally relate to electronic circuits, and more particularly but not exclusively to fast startup switching converters and methods thereof.

BACKGROUND

Switching converters are widely used to convert an input signal into an output signal through the ON and OFF switching of switches. A controller needing a DC power supply voltage, such as a control IC, is generally used to control the switches in the switching converter. When the switching converter is just started up, there needs some time (startup time) to establish the power supply voltage. During the startup time, the switching converter can not work normally.

In most applications, the startup time of the switching converter needs to be minimized. For TRIAC dimming LED drivers, fast startup is especially needed. Since the on-time of the TRIAC is very short in the minimum dimming angle, the startup time of the switching converter will directly limit the dimming depth.

FIG. 1 illustrates a prior switching converter. A rectifier bridge is used to convert an AC input voltage Vin into an uncontrolled DC voltage. A flyback converter comprising a transformer T1, a switch M, a diode Dout and a capacitor Cout converts the uncontrolled DC voltage into an output signal to drive a load. A controller 101 is used to control the ON and OFF switching of the switch M. One terminal of a resistor R1 is coupled to the output terminal of the rectifier bridge. A capacitor C1 is coupled between another terminal of the resistor R1 and the ground. The voltage across the capacitor C1 is used as the power supply voltage of the controller 101. When the switching converter is just started up, the capacitor C1 is charged by the input voltage Vin through the rectifier bridge and the resistor R1. When the voltage across the capacitor C1 is increased to be sufficient to start up the controller 101, the switching converter enters into normal operation. The auxiliary winding of the transformer T1 provides power to the controller 101 through a diode D1. To minimize the startup time, one possible solution is to reduce the resistor R1 or the capacitor C1. But a smaller R1 will increase the power loss, and lead to lower efficiency and higher temperature on this resistor. The capacitor C1 also can not be reduced a lot since it needs to hold the power supply voltage.

FIG. 2 illustrates another prior switching converter. The controller 201 comprises a high voltage current source I1 and a switch S. The capacitor C1 is charged by the high voltage current source I1 through the switch S when the switching converter is just started up. After the switching converter enters into normal operation, the switch S is turned off. The high voltage current source I1 is disconnected from the capacitor C1, and the auxiliary winding provides power to the controller 201 instead. By applying the method shown in FIG. 2, fast startup and high efficiency can be got. However, the switch S is a high voltage device, which is high cost and also hard to be integrated.

SUMMARY

Embodiments of the present invention are directed to a switching converter comprising a first switch, a second switch, a third switch, a controller and a first capacitor. The first switch has a first terminal, a second terminal and a gate terminal, wherein the first terminal is coupled to the input terminal of the switching converter. The second switch has a first terminal, a second terminal and a gate terminal, wherein the first terminal is coupled to the second terminal of the first switch. The third switch has a first terminal, a second terminal and a gate terminal, wherein the first terminal is coupled to the second terminal of the first switch and the first terminal of the second switch. The controller is coupled to the gate terminals of the second and third switches, wherein the controller is configured to control the ON and OFF switching of the second and third switches. The first capacitor has a first terminal and a second terminal, wherein the first terminal is coupled to the second terminal of the third switch and the controller to provide a power supply voltage for the controller, the second terminal is grounded. The switching converter charges the first capacitor through the first and third switches in a first working state, and transfers energy to a load through the first and second switches in a second working state.

In one embodiment, the switching converter is configured in a flyback converter and an auxiliary winding of the transformer in the flyback converter is used to provide power to the controller.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
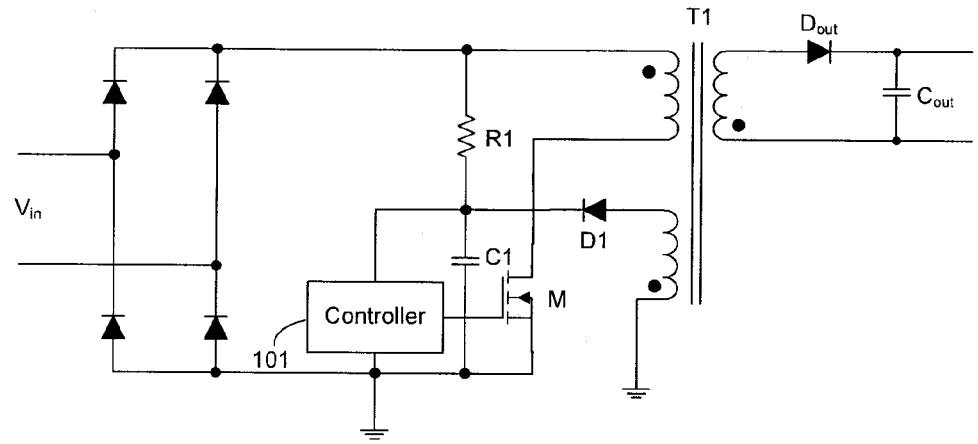
FIG. 1 illustrates a prior switching converter.
Figure 2:
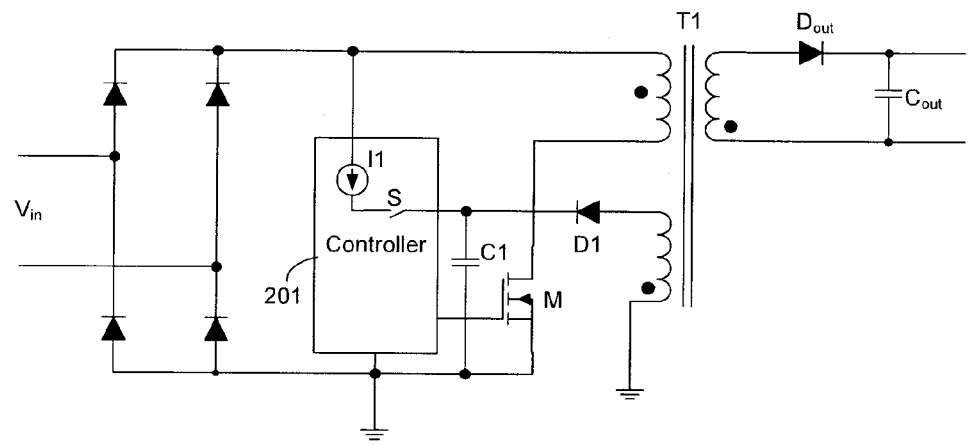
FIG. 2 illustrates another prior switching converter.
Figure 3:
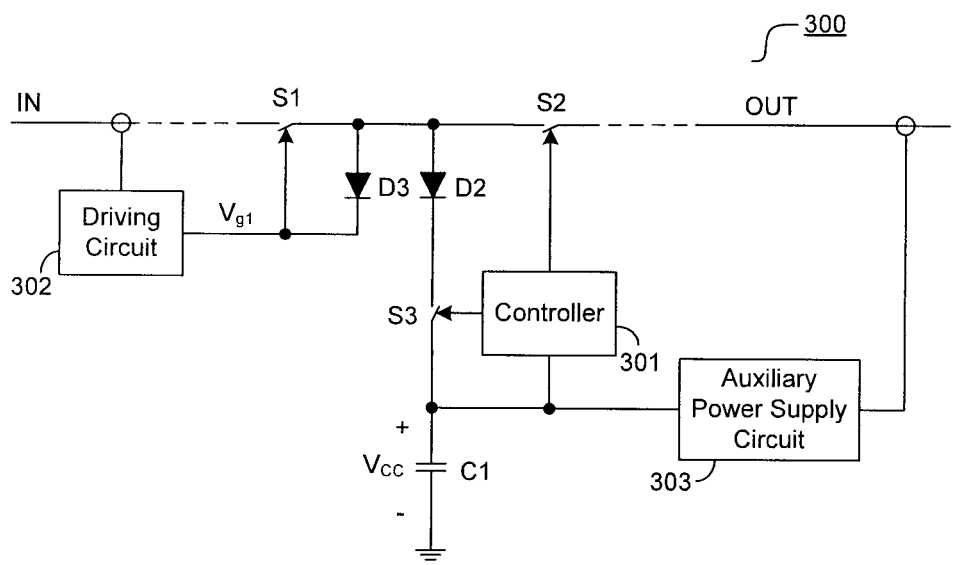
FIG. 3 is a block diagram of a switching converter 300 in accordance with an embodiment of the present disclosure.

FIG. 3 is a block diagram of a switching converter 300 in accordance with an embodiment of the present disclosure. The switching converter 300 comprises switches S1-S3, a controller 301 and a capacitor C1. The switch S1 has a first terminal, a second terminal and a gate terminal, wherein the first terminal is coupled to the input terminal of the switching converter 300. The switch S2 has a first terminal, a second terminal and a gate terminal, wherein the first terminal is coupled to the second terminal of the switch S1. The switch S3 has a first terminal, a second terminal and a gate terminal, wherein the first terminal is coupled to the second terminal of the switch S1 and the first terminal of the switch S2. The controller 301 is coupled to the gate terminals of the switches S2 and S3 to control the ON and OFF switching of these two switches. The capacitor C1 has a first terminal and a second terminal, wherein the first terminal is coupled to the second terminal of the switch S3 and the controller 301 to provide a power supply voltage Vcc to the controller 301, the second terminal is grounded. The switching converter 300 charges the capacitor C1 through the switches S1 and S3 in a first working state, and transfers energy to a load through the switches S1 and S2 in a second working state.

The switches S1-S3 may be any controllable semiconductor devices, such as MOSFET (metal oxide semiconductor field effect transistor), IGBT (isolated gate bipolar transistor) and so on. In one embodiment, the switching converter 300 further comprises a driving circuit 302. The input terminal of the driving circuit 302 is coupled to the input terminal of the switching converter 300, the output terminal is coupled to the gate terminal of the switch S1.

In one embodiment, the switching converter 300 further comprises an auxiliary power supply circuit 303. The input terminal of the auxiliary power supply circuit 303 is coupled to the output terminal of the switching converter 300, the output terminal is coupled to the first terminal of the capacitor C1. During normal operation of the switching converter 300, the auxiliary power supply circuit 303 is used to provide power to the controller 301.

In one embodiment, in order to prevent the capacitor C1 from discharging through the switch S3, the switching converter 300 further comprises a diode D2. The anode of the diode D2 is coupled to the second terminal of the switch S1 and the first terminal of the switch S2, the cathode is coupled to the first terminal of the switch S3.

In one embodiment, the switching converter 300 further comprises a diode D3. The anode of the diode D3 is coupled to the second terminal of the switch S1 and the first terminal of the switch S2, the cathode is coupled to the gate terminal of the switch S1. The voltage at the second terminal of the switch S1 is clamped by the diode D3. The maximum value of the voltage is limited to the gate voltage Vg1 of the switch S1.

Well-known control methods, such as PWM, PFM, off time control, quasi-resonant control, may be utilized in the controller 301.

When the switching converter 300 is just started up, the switch S3 is turned on. The switch S2 is off since the power supply voltage Vcc of the controller 301 has not been established. The switching converter 300 works in a first working state. The capacitor C1 is charged by the input signal IN through the switches S1 and S3, and the power supply voltage Vcc is increased. The switch S1 works in its saturation region and becomes a source/emitter follower. The voltage at the second terminal of the switch S1 follows the gate voltage Vg1.

When the power supply voltage Vcc is increased to be sufficient to start up the controller 301, the switching converter 300 enters into normal operation. The switching converter 300 works in a second working state. The input signal IN is converted into the output signal OUT to drive the load through the switches S1 and S2. The switch S3 is turned off, the auxiliary power supply circuit 303 is used to provide power to the controller 301. When the switch S2 is on, the switch S1 works in its variable resistance region, and the on-resistance of the switch S1 is very small. When the switch S2 is off, the diode D3 clamps the maximum voltage at the second terminal of the switch S1 to the gate voltage Vg1 of the switch S1.

In one embodiment, if the auxiliary power supply circuit 303 can not provide sufficient power to maintain the power supply voltage Vcc, the switching converter 300 will return to the first working state and charge the capacitor C1 through the switches S1 and S3. This may arise when the switching converter 300 has just finished the startup, or the switch S2 is turned off because of fault protection. In one embodiment, the switching converter 300 is a triac dimming LED driver. The auxiliary power supply circuit 303 may not provide sufficient power to maintain the power supply voltage Vcc under a small dimming angle.

In one embodiment, the controller 301 compares the power supply voltage Vcc with a threshold voltage Vth1, and turns off the switch S3 when the power supply voltage Vcc is increased to be larger than the threshold voltage Vth1. In one embodiment, the controller 301 further compares the power supply voltage Vcc with a threshold voltage Vth2 smaller than the threshold voltage Vth1, and turns on the switch S3 when the power supply voltage Vcc is decreased to be smaller than the threshold voltage Vth2.

Since the first terminals of the switches S2 and S3 are coupled to the second terminal of the switch S1, the switches S2 and S3 don't need to sustain high voltage. The startup time of the switching converter 300 is fast, and the cost is lowered.

An AC/DC converter comprising a Flyback converter will be described below in detail. Persons skilled in the art can recognize that, however, the invention is also applicable to any other DC/DC or DC/AC converters.

Figure 4:
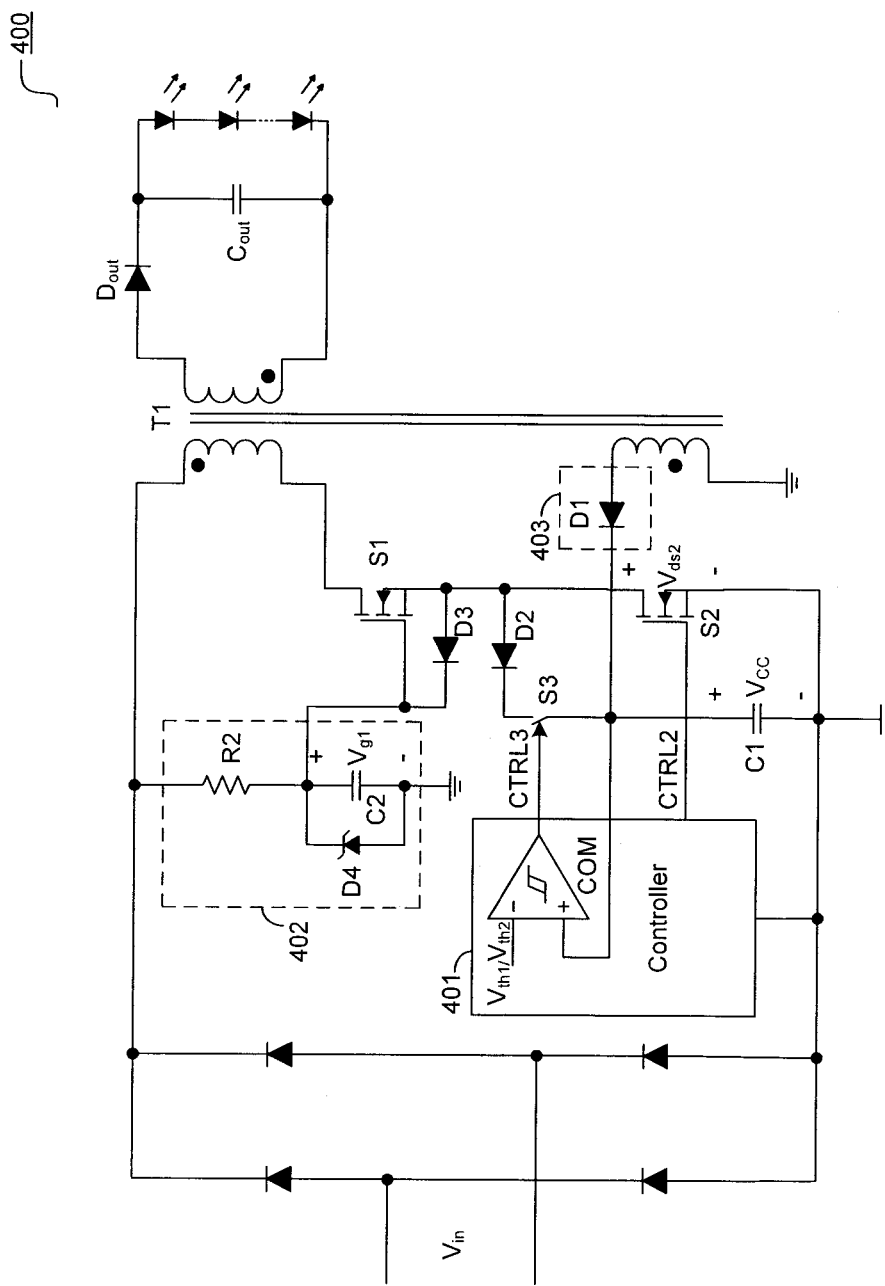
FIG. 4 schematically illustrates a switching converter 400 in accordance with an embodiment of the present disclosure.

FIG. 4 schematically illustrates a switching converter 400 in accordance with an embodiment of the present disclosure. The switching converter 400 is used to drive a LED string. It comprises a rectifier bridge, a transformer T1, switches S1-S3, a capacitor C1, a controller 401, a driving circuit 402, an auxiliary power supply circuit 403, a diode Dout and an output capacitor Cout.

The rectifier bridge receives an AC input voltage Vin and converts it into an uncontrolled DC voltage. The transformer T1 comprises a primary winding, a secondary winding and an auxiliary winding. The switches S1 and S2 are both n-type MOSFET. The drain terminal of the switch S1 is coupled to the primary winding of the transformer T1. The drain terminal of the switch S2 is coupled to the source terminal of the switch S1, the source terminal of the switch S2 is coupled to ground. The first terminal of the switch S3 is coupled to the source terminal of the switch S1 and the drain terminal of the switch S2. The controller 401 is coupled to the gate terminals of the switches S2 and S3. It generates control signals CTRL2 and CTRL3 to control the ON and OFF switching of the switches S2 and S3. The first terminal of the capacitor C1 is coupled to the second terminal of the switch S3 and the controller 401 to provide a power supply voltage Vcc to the controller 401, the second terminal is grounded. The anode of the diode Dout is coupled to the first terminal of the secondary winding of the transformer T1, the cathode is coupled to the first terminal of the capacitor Cout. The second terminal of the capacitor Cout is coupled to the second terminal of the secondary winding. In one embodiment, the diode Dout is replaced by a synchronous switch.

The driving circuit 402 comprises a resistor R2 and a capacitor C2. The first terminal of the resistor R2 is coupled to the input terminal of the switching converter 400 through the rectifier bridge. The first terminal of the capacitor C2 is coupled to the second terminal of the resistor R2 and the gate terminal of the switch S1, the second terminal is grounded. The auxiliary power supply circuit 403 comprises a diode D1. The anode of the diode D1 is coupled to the auxiliary winding of the transformer T1, the cathode is coupled to the first terminal of the capacitor C1. In one embodiment, the auxiliary power supply circuit 403 further comprises a resistor coupled between the auxiliary winding and the anode of the diode D1.

In one embodiment, the switching converter 400 further comprises a diode D2. The anode of the diode D2 is coupled to the source terminal of the switch S1 and the drain terminal of the switch S2, the cathode is coupled to the first terminal of the switch S3.

In one embodiment, the driving circuit 402 further comprises a zener diode D4. The cathode of the zener diode D4 is coupled to the first terminal of the capacitor C2, the anode is grounded. The zener diode D4 is coupled to the capacitor C2 is parallel, so as to clamp the voltage Vg1 across the capacitor C2.

In one embodiment, the switching converter 300 further comprises a diode D3. The anode of the diode D3 is coupled to the source terminal of the switch S1 and the drain terminal of the switch S2, the cathode is coupled to the gate terminal of the switch S1. The diode D3 is used to clamp the drain-source voltage Vds2 of the switch S2. The maximum value of the drain-source voltage Vds2 is limited to the voltage Vg1 across the capacitor C2. When the switching converter 400 works in a discontinuous current mode, after the energy stored in the transformer T1 being all transferred to the load, the magnetizing inductance of the transformer T1 will resonate with the parasitic capacitance of the switch S2. The resonant energy is recycled into the capacitor C2 through the diode D3, so the efficiency of the switching converter 400 is improved. In this situation, the gate voltage Vg1 of the switch S1 can be maintained even when the AC input voltage Vin is very low. This is highly appreciated in triac dimming LED drivers.

In one embodiment, the controller 401 comprises a hysteresis comparator COM. The non-inverting input terminal of the comparator COM is coupled to the first terminal of the capacitor C1 to receive the power supply voltage Vcc, the inverting input terminal is configured to receive the threshold voltage Vth1 and Vth2. When the power supply voltage Vcc is increased to be larger than or equal to the threshold voltage Vth1, the output signal of the comparator COM becomes logical high to turn off the switch S3. When the power supply voltage Vcc is decreased to be smaller than or equal to the threshold voltage Vth2, the output signal of the comparator COM becomes logical low to turn on the switch S3. The initial value of the output signal of the comparator COM is logical low.

In one embodiment, the switches S2, S3 and the controller 401 are all integrated in a control IC. In one embodiment, the control IC further integrates the diode D2.

Figure 5:
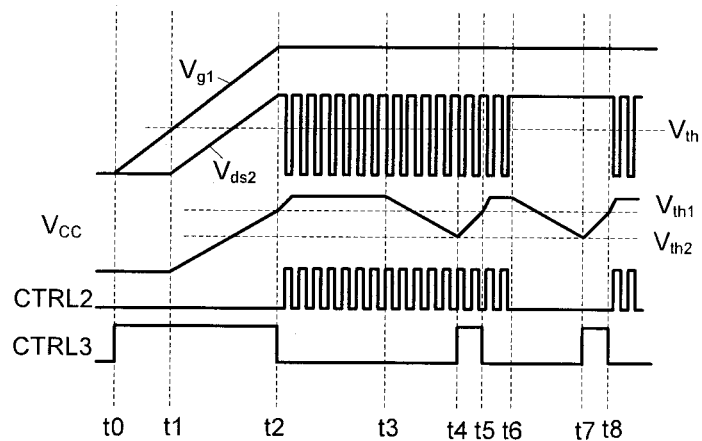
FIG. 5 is a working waveform of the switching converter 400 shown in FIG. 4 in accordance with one embodiment of the present disclosure.

FIG. 5 is a working waveform of the switching converter 400 shown in FIG. 4 in accordance with one embodiment of the present disclosure. At t0, the switching converter 400 is started up, and the switch S3 is turned on. Since the power supply voltage Vcc has not been established, the switch S2 is off. The capacitor C2 is charged by the AC input voltage Vin through the rectifier bridge and the resistor R2, and the voltage Vg1 across the capacitor C2 is increased.

At t1, the voltage Vg1 is increased to the on-threshold voltage Vth of the switch S1, the switch S1 is turned on. The capacitor C1 is charged by the AC input voltage Vin through the rectifier bridge, the switches S1, S3, and the diode D2. The power supply voltage Vcc is increased. The switch S1 works as a source follower, so Vcc=Vg1−Vth.

At t2, the power supply voltage Vcc is increased to the threshold voltage Vth1, the switch S3 is turned off. The switch S2 is turned on or off under the control of the controller 401, so as to convert the AC input voltage Vin into an expected output current to drive the LED string. The power supply voltage Vcc is maintained by the auxiliary winding of the transformer T1.

At t3, the power supply voltage Vcc starts to decrease since the auxiliary winding can not provide sufficient power. This may arise when the switching converter 400 has just finished the startup, etc. At t4, the power supply voltage Vcc is decreased to the threshold voltage Vth2, the switch S3 is turned on. The capacitor C1 is charged by the AC input voltage Vin through the rectifier bridge, the switches S1, S3, and the diode D2. The power supply voltage Vcc is increased. At t5, the power supply voltage Vcc is increased to the threshold voltage Vth1, and the switch S3 is turned off again. In one embodiment, once the power supply voltage Vcc is reduced to the threshold voltage Vth2, the switch S2 is turned off until the power supply voltage Vcc is increased to the threshold voltage Vth1.

The switching converter 400 may encounter various fault conditions, such as over current, over voltage, over temperature and so on. When a fault condition is detected, the switching converter 400 often turns off the switch S2 for self-protection. Such as shown in FIG. 5, at t6, a fault condition is detected and the switch S2 is turned off. The auxiliary winding of the transformer T1 can not further provide power to the capacitor C1, and the power supply voltage Vcc is decreased.

At t7, the power supply voltage Vcc is decreased to the threshold voltage Vth2, the switch S3 is turned on. The capacitor C1 is charged by the AC input voltage Vin through the rectifier bridge, the switches S1, S3, and the diode D2. The power supply voltage Vcc is increased. At t8, the power supply voltage Vcc is increased to the threshold voltage Vth1, and the switch S3 is turned off again. The switching converter 400 tries to return to normal operation. In one embodiment, if the fault condition disappears during t6-t8, the switching converter 400 will return to normal operation automatically.

In one embodiment, once a fault condition is detected, the switch S3 won't be turned on until the power supply voltage Vcc is decreased to a threshold voltage Vth3 smaller than the threshold voltage Vth2. In one embodiment, the threshold voltage Vth1 is 10V, the threshold voltage Vth2 is 9V, and the threshold voltage Vth3 is 7V. In one embodiment, the switch S3 is turned on when the power supply voltage Vcc is decreased to the threshold voltage Vth3, and turned off when the power supply voltage is increased to the threshold voltage Vth1. The process above is repeated. The switching converter 400 tries to resume normal operation only when the power supply voltage Vcc reaches the threshold voltage Vth1 for N times (e.g. N=4).

Figure 6:
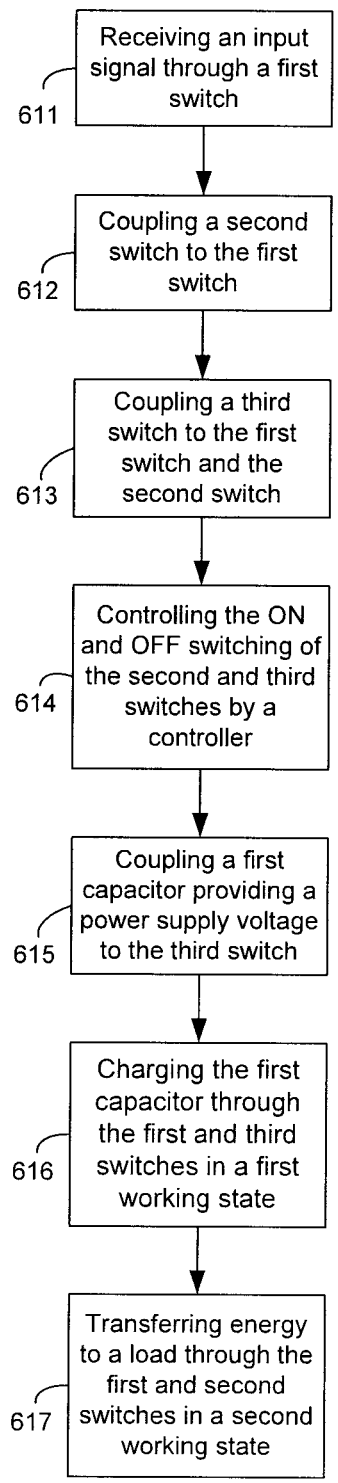
FIG. 6 is a flow chart of a switching converting method, in accordance with an embodiment of the present disclosure.

FIG. 6 is a flow chart of a switching converting method, in accordance with an embodiment of the present disclosure. It comprises steps 611-617.

At step 611, an input signal is received through a first switch.

At step 612, a second switch is coupled to the first switch.

At step 613, a third switch is coupled to the first switch and the second switch.

At step 614, a controller is used to control the ON and OFF switching of the second and third switches.

At step 615, a first capacitor is coupled to the third switch, wherein the first capacitor provides a power supply voltage to the controller.

At step 616, the first capacitor is charged through the first and third switches in a first working state.

At step 617, energy is transferred to a load through the first and second switches in a second working state.

In one embodiment, the method further comprises: comparing the power supply voltage with a first threshold voltage and a second threshold voltage smaller than the first threshold voltage; turning off the third switch when the power supply voltage is increased to be larger than the first threshold voltage; and turning on the third switch when the power supply voltage is decreased to be smaller than the second threshold voltage.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A switching converter having an input terminal and an output terminal, comprising:
   a first switch having a first terminal, a second terminal and a gate terminal, wherein the first terminal is coupled to the input terminal of the switching converter;
   a second switch having a first terminal, a second terminal and a gate terminal, wherein the first terminal is coupled to the second terminal of the first switch;
   a third switch having a first terminal, a second terminal and a gate terminal, wherein the first terminal is coupled to the second terminal of the first switch and the first terminal of the second switch;
   a controller coupled to the gate terminals of the second and third switches, wherein the controller is configured to control the ON and OFF switching of the second and third switches; and
   a first capacitor having a first terminal and a second terminal, wherein the first terminal is coupled to the second terminal of the third switch and the controller to provide a power supply voltage for the controller, the second terminal is grounded; wherein
   the switching converter charges the first capacitor through the first and third switches in a first working state, and transfers energy to a load through the first and second switches in a second working state.

2. The switching converter of claim 1, further comprising an auxiliary power supply circuit having an input terminal and an output terminal, wherein the input terminal is coupled to the output terminal of the switching converter, the output terminal is coupled to the first terminal of the first capacitor.

3. The switching converter of claim 1, wherein the controller compares the power supply voltage with a first threshold voltage and a second threshold voltage smaller than the first threshold voltage, and wherein the third switch is turned off when the power supply voltage is increased to be larger than the first threshold voltage, and turned on when the power supply voltage is decreased to be smaller than the second threshold voltage.

4. The switching converter of claim 1, further comprising a second diode having an anode and a cathode, wherein the anode is coupled to the second terminal of the first switch and the first terminal of the second switch, the cathode is coupled to the first terminal of the third switch.

5. The switching converter of claim 1, further comprising a third diode having an anode and a cathode, wherein the anode is coupled to the second terminal of the first switch and the first terminal of the second switch, the cathode is coupled to the gate terminal of the first switch.

6. The switching converter of claim 1, further comprising a driving circuit having an input terminal and an output terminal, wherein the input terminal is coupled to the input terminal of the switching converter, the output terminal is coupled to the gate terminal of the first switch.

7. The switching converter of claim 6, wherein the driving circuit comprises:
   a resistor having a first terminal and a second terminal, wherein the first terminal is coupled to the input terminal of the switching converter; and
   a second capacitor having a first terminal and a second terminal, wherein the first terminal is coupled to the second terminal of the resistor and the gate terminal of the first switch, the second terminal is grounded.

8. A switching converter having an input terminal and an output terminal, comprising:
   a transformer having a primary winding, a secondary winding and an auxiliary winding;
   a first switch having a drain terminal, a source terminal and a gate terminal, wherein the drain terminal is coupled to the primary winding of the transformer;
   a second switch having a drain terminal, a source terminal and a gate terminal, wherein the drain terminal is coupled to the source terminal of the first switch, the source terminal is coupled to ground;
   a third switch having a first terminal, a second terminal and a gate terminal, wherein the first terminal is coupled to the source terminal of the first switch and the drain terminal of the second switch;
   a controller coupled to the gate terminals of the second and third switches, wherein the controller is configured to control the ON and OFF switching of the second and third switches; and
   a first capacitor having a first terminal and a second terminal, wherein the first terminal is coupled to the second terminal of the third switch and the controller to provide a power supply voltage for the controller, the second terminal is grounded;
   a first diode having an anode and a cathode, wherein the anode is coupled to the auxiliary winding of the transformer, the cathode is coupled to the first terminal of the first capacitor;
   a resistor having a first terminal and a second terminal, wherein the first terminal is coupled to the input terminal of the switching converter; and
   a second capacitor having a first terminal and a second terminal, wherein the first terminal is coupled to the second terminal of the resistor and the gate terminal of the first switch, the second terminal is grounded.

9. The switching converter of claim 8, wherein the controller compares the power supply voltage with a first threshold voltage and a second threshold voltage smaller than the first threshold voltage, and wherein the third switch is turned off when the power supply voltage is increased to be larger than the first threshold voltage, and turned on when the power supply voltage is decreased to be smaller than the second threshold voltage.

10. The switching converter of claim 8, further comprising a second diode having an anode and a cathode, wherein the anode is coupled to the source terminal of the first switch and the drain terminal of the second switch, the cathode is coupled to the first terminal of the third switch.

11. The switching converter of claim 8, further comprising a third diode having an anode and a cathode, wherein the anode is coupled to the source terminal of the first switch and the drain terminal of the second switch, the cathode is coupled to the gate terminal of the first switch.

12. The switching converter of claim 1, further comprising a zener diode having an anode and a cathode, wherein the anode is grounded, the cathode is coupled to the second terminal of the resistor and the first terminal of the second capacitor.

13. A switching converting method, comprising:
receiving an input signal through a first switch;
coupling a second switch to the first switch;
coupling a third switch to the first switch and the second switch;
controlling the ON and OFF switching of the second and third switches by a controller;
coupling a first capacitor to the third switch, wherein the first capacitor provides a power supply voltage for the controller;
charging the first capacitor through the first and third switches in a first working state; and
transferring energy to a load through the first and second switches in a second working state.

14. The method of claim 13, further comprising:
comparing the power supply voltage with a first threshold voltage and a second threshold voltage smaller than the first threshold voltage;
turning off the third switch when the power supply voltage is increased to be larger than the first threshold voltage; and
turning on the third switch when the power supply voltage is decreased to be smaller than the second threshold voltage.

* * * * *